(12) United States Patent
Menne et al.

(10) Patent No.: US 10,799,885 B2
(45) Date of Patent: Oct. 13, 2020

(54) METHOD AND DEVICE FOR CLEANING FIBER SUSPENSIONS BY MEANS OF FLOTATION

(71) Applicant: RITHCO PAPERTEC GmbH, Krefeld (DE)

(72) Inventors: Ralf Menne, Munich (DE); Andreas Ritter, Krefeld (DE); Oliver Mamat, Wega (DE)

(73) Assignee: Rithco Papertec GmbH, Krefeld (DE)

( * ) Notice: Subject to any disclaimer, the term of this patent is extended or adjusted under 35 U.S.C. 154(b) by 833 days.

(21) Appl. No.: 15/500,479

(22) PCT Filed: Aug. 14, 2015

(86) PCT No.: PCT/DE2015/000408
§ 371 (c)(1),
(2) Date: Jan. 30, 2017

(87) PCT Pub. No.: WO2016/026477
PCT Pub. Date: Feb. 25, 2016

(65) Prior Publication Data
US 2017/0225176 A1    Aug. 10, 2017

(30) Foreign Application Priority Data

Aug. 22, 2014  (DE) .................. 10 2014 012 666

(51) Int. Cl.
*B03D 1/24*        (2006.01)
*D21B 1/32*        (2006.01)
(Continued)

(52) U.S. Cl.
CPC .......... *B03D 1/247* (2013.01); *B01F 3/04503* (2013.01); *B01F 5/043* (2013.01);
(Continued)

(58) Field of Classification Search
CPC ...... B03D 1/247; B03D 1/242; B03D 1/1456; D21B 1/327; B01F 5/043; B01F 5/0421; B01F 3/04503; Y02W 30/646
(Continued)

(56) References Cited

U.S. PATENT DOCUMENTS 4,331,534 A * 5/1982 Barnscheidt ............. B03D 1/24
162/4
4,842,777 A * 6/1989 Lamort ................. B01F 5/0415
209/170
(Continued)

FOREIGN PATENT DOCUMENTS

DE         69329061 T2    2/1955
DE    102008056040 A1    5/2010
(Continued)

OTHER PUBLICATIONS

International Search Report, dated Jan. 7, 2016.

*Primary Examiner* — Thomas M Lithgow
(74) *Attorney, Agent, or Firm* — Cohen & Hildebrand, PLLC

(57) ABSTRACT

A device and method for cleaning contaminated solid-liquid mixtures by removing impurities and contaminants from an aqueous paper fiber suspension by flotation. Apparatus includes a first conduit (2) for a liquid, a second conduit (3) for a solid-liquid mixture, a third conduit (4) connecting first and second conduit (2, 3), a Venturi mixing element (5) with cones (7, 11), having small through-opening into chamber (9) which forms a cavity with small through-opening (12, 13) of the cones; the through-opening of first cone (7) connected with first conduit (2) and the rough-opening connected to second conduit (2), the small through-opening (12) of first cone (7) and the non-conical conduit sections arranged in longitudinal axial alignment, a fourth conduit (6) for conveying gas, wherein the fourth conduit (6) opens to
(Continued)

the Venturi mixing element (5), and a fractionator arranged downstream of the second conduit (3) for removing the foam produced by flotation.

17 Claims, 4 Drawing Sheets

(51) Int. Cl.
  *B01F 5/04*   (2006.01)
  *B01F 3/04*   (2006.01)
  *B03D 1/14*   (2006.01)
(52) U.S. Cl.
  CPC ............ *B01F 5/0421* (2013.01); *B03D 1/242* (2013.01); *D21B 1/327* (2013.01); *B03D 1/1456* (2013.01); *Y02W 30/646* (2015.05)
(58) Field of Classification Search
  USPC ......................................................... 209/170
  See application file for complete search history.

(56) References Cited

U.S. PATENT DOCUMENTS

| | | | |
|---|---|---|---|
| 5,514,267 A | | 5/1996 | Machiya et al. |
| 5,624,609 A | * | 4/1997 | Serres ................... B01F 5/0471 261/36.1 |
| 2017/0225176 A1 | * | 8/2017 | Menne ................... B03D 1/242 |

FOREIGN PATENT DOCUMENTS

| | | | |
|---|---|---|---|
| DE | 102008064271 A1 | | 7/2010 |
| DE | 102011009792 A1 | | 8/2012 |
| EP | 0963784 A | | 12/1999 |
| JP | 58-132586 U | * | 9/1983 |
| JP | H1176780 A | | 3/1999 |
| JP | 2005028306 A | | 2/2005 |
| JP | 2008086860 A | * | 4/2008 |
| WO | 8000423 A1 | | 3/1980 |

\* cited by examiner

METHOD AND DEVICE FOR CLEANING FIBER SUSPENSIONS BY MEANS OF FLOTATION

This is an application filed under 35 USC § 371 of PCT/DE2015/000408 filed on Aug. 14, 2015 claiming priority to DE 10 2014 012 66$8 filed on Aug. 22, 2014, each which is incorporated by reference.

BACKGROUND OF THE INVENTION

The invention relates to a method and an apparatus for cleaning contaminated solid-liquid mixtures, and the use of the method procedure and the apparatus. More particularly, the invention relates to a method and an apparatus for removing contaminants and impurities from an aqueous paper fiber suspension by flotation.

Flotation refers to a physical-chemical separation process for fine-grained solids based on the different surface wettability of the particles. Gas bubbles readily accumulate on hydrophobic surfaces, i.e. on surfaces that are difficult to wet with water, thus imparting buoyance on the particles, causing them to float. A prerequisite is that the employed gas is difficult to dissolve in water. Under this condition, the likewise hydrophobic gas bubbles accumulate on the hydrophobic particle surfaces, or the likewise hydrophobic particles accumulate on the surface of the hydrophobic gas bubbles. As a result, foam or a floating sludge containing the substances to be removed is formed by flotation.

Known are flotation processes for processing a suspension obtained from printed waste paper, wherein the ink particles have already been detached from the fibers. Use is hereby made of the fact that the fiber material remains in the fiber suspension due to its more hydrophilic character, whereas the unwanted contaminant particles are hydrophobic and therefore reach the foam together with the air bubbles. Because not all solids are floated out, but the fibers are separated from the impurities and essentially only the impurities are floated out, this is referred to as selective flotation. The impurities removed by the selective flotation are, in addition to the printing ink, in particular adhesives, fine plastic particles and eventually also resins.

In waste paper processing, waste paper is beaten in a pulper and backwater is added so as obtain a pumpable suspension. Here, in a first sorting step, large-size contaminants and impurities that cannot be comminuted and pumped, such as cords and solid films are removed. The resulting fiber suspension is then subjected to a series of mechanical sorting stages, e.g. screening baskets, where other smaller contaminants and impurities are removed.

After the so-called pre-sorting, the fiber suspension is subjected to additional sorting, frequently also a deinking plant or even finer screening baskets. The term "deinking" is generally used not only for the removal of ink particles, but generally also for the selective flotation of impurities from fiber suspensions. In a deinking plant, the fiber suspension is enriched with air.

For this purpose, water is initially enriched with air. Adding air to, water requires a substantial amount of energy, usually in form of electricity. A pump applies a water pressure of about 8 bar to a volume of water and feeds this volume of water into a pressure tank. Compressed air at a pressure of about 10 bar is introduced into the pressure tank, with the air volume corresponding to about 20% of the water volume (the ratio of air to water is here approximately 1 to 5).

Mixing elements operating according to the Venturi principle are known for enriching water with air. For example, DE 693 29 061 T2 discloses an apparatus for efficiently mixing gas bubbles with a liquid through dispersion and effectively dissolving a gas in a liquid. The apparatus includes a mixing element operating according to the Venturi principle with a throttled section formed by a portion of a fluid flow passage and having a reduced cross sectional area, a section that is contiguous with the throttled section and includes a section of the fluid flow passage that is gradually enlarged toward the downstream side, a gas inlet that is arranged somewhat downstream in a region of the enlarged section of the throttled section and a mixing section arranged downstream of the enlarged section, with a downstream end. The apparatus includes furthermore a fluid tube having a proximal end that is connected with the downstream end of the mixing section of the mixing element, and a distal end that is connected with a nozzle section having a plurality of nozzle openings, wherein a second throttled section is arranged immediately before the nozzle section, which is formed by a section of the fluid flow passage having a reduced cross-sectional area.

The water enriched with air, i.e. the air suspension then combined with the fiber suspension.

Only the impurities and contaminants that are already separated from the fibers attach to the air bubbles and are discharged in a downstream fractionator through flotation of the generated foam. Impurities and contaminants still adhering to the fibers remain unaffected in ink suspension and affect the quality of paper, such as printing and printability as well as physical parameters of the paper. Even a multiple pass through several, for example, cascaded deinking cells usually produces only adequate, but not outstanding results.

Chemical additives are known that are suitable for dissolving the impurities and contaminants, from the paper fibers or masking them. However, the known chemical additives are neither sufficiently efficient nor economical.

Another problem with known flotation processes and equipment is that not only impurities and contaminants are floated but that undesirably a paper fiber fraction of more than 2% is also removed.

In practice, a deinking plant is composed of several consecutively arranged deinking cells. The separated impurities and contaminants are usually conveyed to a secondary cell to recover lost paper fibers. However, the fiber loss in a deinking plant is still greater than 2%.

The impurities and contaminants removed in a deinking plant are for the most part only ink particles. Other undesirable particles, such as stickies, metals, plastics, resins and organic substances are usually not removed in a deinking plant.

The material density range in a deinking plant is normally between 1% and 1.5%. The pH is approx. 7.

The prior art regarding flotation processes for fiber suspensions is already quite advanced.

For example, DE 10 2008 056 040 A1 discloses a process for removing contaminants from an aqueous fiber suspension by using gas bubbles, wherein at least one flow of gas is supplied to the flow of the fiber suspension in at least one mixing apparatus and gas bubbles are formed, whereby contaminants are accumulated from the fiber suspension in a flotation foam and removed therewith. Here, at least one inner flow of gas is supplied into the interior of the stream of the fiber suspension, or alternatively an outer flow of gas is supplied to the exterior of the flow of fiber suspension.

DE 10 2008 064 271 A1 discloses a method of using gas bubbles for removing solids from an aqueous fiber suspension, in particular a waste paper suspension, wherein gas supplied to the fiber suspension in at least one mixing apparatus and gas bubbles are formed. Thereafter, the gassed suspension is conveyed from the mixing apparatus via an adjustable flow resistance, especially via a throttle, into a flotation vessel where the solids are separated by flotation. The process allows adjustment of the air content of the gassed suspension.

Furthermore, DE 10 2011 009 792 A1 discloses a method for purifying contaminated fibers, wherein in a first process step the fibers are mixed with liquid, and are combined, in a second step, as a solid-liquid mixture while flowing with an air-liquid mixture, wherein the confluence of the air-liquid mixture with the solid-liquid mixture is carried out with strongly different flow velocities and wherein this process is controlled so that at the same time a significant dilution of the solid-liquid mixture occurs and the dissolved contaminant particles attach to the air bubbles of the air-liquid mixture, and in a third process step for separating the fiber content, the contaminant-loaded foam from the air bubbles and the liquid, the mixture produced in the second process step fractionated, whereby the foam generated on the surface and loaded with impurities is separated from the purified fibers.

However, only certain contaminants and impurities can be removed from the fiber suspension when using gas bubbles with today's flotation plants and processes for removing contaminants and impurities from a fiber suspension. It would therefore be desirable if not only ink particles could be floated by the additional detachment of contaminant particles from the fibers, especially paper fibers, but also a majority of other contaminants and impurities (stickies, very small plastic particles, etc.) could be aggregated in the foam and removed from the fiber suspension.

BRIEF SUMMARY OF THE INVENTION

It is therefore an object of the invention to provide an apparatus and a method which overcome the aforementioned disadvantages of the prior art.

This object is achieved by an apparatus according to independent claim 1 and a method according to independent claim 6. Advantageous embodiments of the apparatus are recited in the dependent claims 2 to 5, and advantages embodiments of the method are recited in the dependent claims 7 to 12.

A first aspect of the invention relates to an apparatus for cleaning contaminated solid-liquid mixtures, including at least a first conduit for supplying a fluid, preferably water, at least one second conduit for conveying a solid-liquid mixture, preferably a fiber suspension, particularly preferably a paper fiber suspension, at least a third conduit connecting the first and second conduit and including at least one mixing element operating according to the Venturi principle, hereinafter referred to as Venturi mixing element, wherein the Venturi mixing element has two oppositely directed cones, each opening with its respective small through-opening into a chamber forming a cavity, wherein the region of the opening into the chamber forming the cavity is constructed such that the respective small through-opening of the cones is continued in a non-conical conduit section corresponding to the cross sectional area of the small through-openings, with these non-conical conduit sections opening into the chamber between the cones, the large through-opening of the first cone is connected to the first conduit via the third conduit and the large through-opening of the second cone is connected to the second conduit via the third conduit, the small through-opening of the first cone is formed smaller than the small through-opening of the second cone and the two oppositely directed cones and the non-conical conduit sections are aligned relative to one another along the longitudinal axis, at least a fourth conduit configured to convey a gas, preferably air, wherein the fourth conduit opens into the chamber of the Venturi mixing element forming the chamber, and at least one fractionator arranged downstream of the second conduit for removing the foam generated by the flotation.

Preferably, the small through-opening of the first cone is between 20 to 40% smaller than the small through-opening of the second cone.

By conveying the liquid to the Venturi mixing element and conveying the gas, preferably air, to the Venturi mixing element, the liquid is enriched in the Venturi mixing element with gas bubbles of different diameter, while at the same time increasing the flow speed of the liquid. The liquid enriched with gas bubbles of different diameter is subsequently introduced into the contaminated solid-liquid mixture, wherein the liquid enriched with gas bubbles has greater flow velocity than the solid-liquid mixture. The liquid enriched with gas bubbles and the solid-liquid mixture are intermixed, whereby impurities and contaminants are detached from the solids of the solid-liquid mixture by the kinetic energy of the gas bubbles and attached on the gas bubbles. Due to the attachment on the gas bubbles, the impurities and contaminants are subsequently removed as foam from the solid-liquid mixture. Finally, the solid-liquid mixture and the foam are separated in a subsequent flotation process.

It is essential that the junction of the two oppositely directed cones into the cavity between the two small through-openings of the cones, into which the fourth conduit opens, is formed such that the respective small through-opening of the cones is continued in a non-conical conduit section corresponding to the cross-sectional area of the small through-openings, and this non-conical conduit section opens into, the cavity between the cones. This cavity forms a substantial enlargement of the unobstructed cross-section for the liquid. The flow velocity of the liquid supplied to the Venturi mixing element via the third conduit is accelerated by the first cone and enters, after having traversed the small through-opening of the non-conical conduit section downstream of the cone, the cavity as a fluid jet with a higher flow velocity. As a result, negative pressure is generated, causing gas to be sucked into the chamber through the fourth conduit. The liquid flowing into the cavity at increased speed entrains this gas drawn into the cavity or carries it along.

After the cavity, that is, after the abrupt increase in the cross-sectional area for the liquid that passes this cavity quasi as a fluid jet, the liquid jet enters the non-conical conduit section of the small through-opening of the second cone. This non-conical conduit section has a larger diameter than the liquid jet and is adjoined by the second cone the where the cross-sectional area for the liquid is once more enlarged. In this non-conical conduit section and thereafter in the second cone of the Venturi mixing element, the liquid is very intensively mixed with the absorbed or entrained gas, wherein the gas is dispersed in the liquid as small bubbles. When the liquid emerges from the Venturi mixing element into the third conduit, the liquid is strongly enriched with gas bubbles of different sizes. This mixture of gas bubbles with different sizes in the liquid is important in order to ensure attachment to a wide range of contaminants and impurities of different sizes to be separated. The quantity and size distribution of the gas bubbles in the liquid hereby depends, aside from the flow velocity of the liquid and the drawn-in quantity of gas, to a large extent on the construction of the Venturi mixing element which will be described in detail below.

In one embodiment of the invention, the diameter of the large through-opening of the first cone is between 10 and 20 mm and the diameter of the small through-opening of the first cone is between 14 and 16 mm, it being understood that the diameter of the small through-opening is always smaller than the diameter of the large through-opening. The diameter of the small through-opening of the second cone is between 12 and 20 mm and the diameter of the large through-opening of the second cone is between 16 and 24 mm, whereby the diameter of the small through-opening is hereby of course always smaller than the diameter of the large through-opening. There is an additional condition that the diameter of the small through-opening of the first cone is at least 2 mm smaller than the diameter of the small through-opening of the second cone. The length of the non-conical conduit sections is between 20 and 80 mm. The distance between the two opposite openings of the non-conical conduit sections into the cavity, i.e. the overall width of the cavity, is between 6 and 20 mm.

In another embodiment of the invention, the liquid enriched with gas bubbles of different size and size distribution has a ratio of gas to liquid of 1-4:1, preferably 1:1.

In one embodiment of the invention, the Venturi mixing element has a plurality of pair-wise arranged and oppositely directed cones, with each of the cones opening with their small through-opening into a chamber forming a cavity, wherein the region of the opening into the cavity is formed such that each small through-opening of the cones is continued in a non-conical conduit section corresponding to the cross-sectional area of the small through-openings, with this non-conical conduit section opening into the cavity between the cones. All cones hereby open into a common cavity wherein, as previously described, two oppositely directed cones are each aligned in an axial direction. The number of cone pairs is between 2 and 25, preferably between 4 and 20. Since the quantity of gas can vary greatly in different systems, it is advantageous to adjust for specific applications the absorbed quantity of gas and the bubble size by way of the number of cone pairs arranged in the Venturi mixing element. For example, a Venturi mixing element with up to 4 cone pairs can be used in a DN 60 conduit. For example, up to 7 cone pairs are possible in a Venturi mixing element for a DN 80 conduit. Up to 19 cone pairs can be arranged in a Venturi mixing element for a DN 120 conduit.

In another embodiment of the invention, the Venturi mixing element is designed in such a way that the gas bubble size can be adjusted for a specific application. For example, the cross sections of the third and fourth conduit in the Venturi mixing element may be changed. The cross-sections of the small through-openings of the cones and the lengths of the non-conical conduit segments, via which the small through-openings of the cones open into the cavity between the cones in the Venturi mixing element, may be customized specific for an application and thereby affect the size and the size distribution of the gas bubbles in the liquid.

In one embodiment of the invention, the third conduit opens into the and conduit at an angle of 90°±45°.

In another embodiment of the invention, the third conduit opens into the second conduit at an angle of 90°. Preferably, the second conduit has in this case a larger diameter than the third conduit. When introducing the liquid enriched with differently sized gas bubbles into the solid-liquid mixture, the contaminant particles become detached from the paper fiber.

In another embodiment of the invention, the third conduit opens into the second conduit at an angle of 45° in the flow direction of the second conduit.

In an alternative embodiment of the invention, the third conduit opens into the second conduit at an angle of 45° in opposition to the flow direction of the second conduit. It should be noted here that the angle should not to fall 45°, because otherwise intermixing of the liquid enriched with gas bubbles with the solid-liquid mixture becomes less effective and the subsequent fractionation in the flotation is also no longer effective.

In another embodiment of the invention, the liquid in the first conduit has a pressure of 2 to 4 bar.

In another embodiment of the invention, the liquid in the first conduit has a flow velocity of 1 m/s to 5 m/s.

In another embodiment of the invention, the solid-liquid mixture in the second conduit has a flow velocity of <4 m/s.

In another embodiment of the invention, the liquid in the third conduit downstream of the Venturi mixing element enriched with gas bubbles has a flow rate of 5-40 m/s, preferably 5-25 m/s, more preferably 9-25 m/s.

In another embodiment of the invention, the liquid is water, preferably clear water or white water.

In another embodiment of the invention, the apparatus includes one or more additional conduits each having a Venturi mixing element, which are cascaded and arranged downstream of the junction of the third conduit and the second conduit. Intermixing of the gas bubbles in the solid-liquid mixture is improved by introducing into the material-liquid mixture multiple times a fluid enriched with gas bubbles of different sizes. In addition, this increases the cleaning effect, making it advantageous to use multiple Venturi mixing elements and the introducing liquid enriched with gas bubbles multiple times into a solid-liquid mixture.

In another embodiment of the invention, the opening of the third conduit into the second conduit is fan-shaped. This allows the liquid enriched with gas bubbles to be introduced into the solid-liquid mixture with a distribution extending over a larger area.

In another embodiment of the invention, the solid-liquid mixture has after the introduction of the liquid enriched with gas bubbles a solid fraction of ≤2% by weight.

In another embodiment of the invention, the apparatus includes control options. Accordingly, controllable sliders are arranged before and after the Venturi mixing element. Likewise, an adjustable slider is arranged in the fourth conduit. These sliders can be operated electrically or manually. The aforementioned control options affect the number, the size and the size distribution of the gas bubbles in the liquid.

As an essential advantage of the apparatus according to the invention, in particular of the Venturi mixing element, the liquid is enriched with a mixture of gas bubbles of different size, without requiring energy-intensive compression of the gas. It has also been found that the gas bubbles in the liquid have a high kinetic energy, causing contaminants or impurities adhering to the fibers to become detached from the fibers when the gas bubbles strike the fibers.

Another aspect of the invention relates to a method for purifying contaminated solid-liquid mixtures, with the steps of:

supplying a liquid, preferably water, to a Venturi mixing element;

conveying a gas, preferably air, to the Venturi mixing element, enriching the liquid in the Venturi mixing element with gas bubbles of different size and size distribution, conveying the liquid enriched with gas bubbles of different size and size distribution to a contaminated solid-liquid mixture, wherein the liquid enriched with gas bubbles has a higher flow velocity than the solid-liquid mixture, intermixing the liquid enriched with gas bubbles and the solid-liquid mixture, whereby impurities and contaminants are detached from the solids of the solid-liquid mixture by the kinetic energy of the gas bubbles and accumulate on the gas bubbles, with the gas bubbles subsequently removing the impurities and contaminants from the solid-liquid mixture as foam, separating the solid-liquid mixture and the foam in a subsequent flotation process.

In one embodiment of the invention, the solid-liquid mixture is a fiber suspension, preferably a paper fiber suspension.

In another embodiment of the invention, the liquid is enriched with gas bubbles of different size and size distribution such that the liquid enriched with gas bubbles has a ratio of gas to fluid of 1-4:1, preferably 1:1.

In another embodiment of the invention, the liquid in conduit has pressure of 2 to 4 bar.

In another embodiment of the invention, the liquid flows in the first conduit at a flow velocity of 1 m/s to 5 m/s.

In another embodiment of the invention, the solid-liquid mixture flows in the second conduit with a flow velocity of <4 m/s.

In another embodiment of the invention, the liquid enriched with gas bubbles flows in the third conduit downstream of the Venturi mixing element at a flow rate of 5-40 m/s, preferably 5-25 m/s, preferably 9-25 m/s.

In one embodiment of the invention, the liquid enriched with gas bubbles is conveyed to the solid-liquid mixture at an angle of 90°±45°.

In another embodiment of the invention, the liquid enriched with gas bubbles is conveyed to the solid-liquid mixture at an angle of 90°.

In another embodiment of the invention, the liquid enriched with gas bubbles is conveyed to the solid-liquid mixture at an angle of 45° in the flow direction of the solid-liquid mixture.

In an alternative embodiment of the invention, liquid enriched with gas bubbles is conveyed to the solid-liquid mixture at an angle of 45° in opposition of the flow direction of the solid-liquid mixture.

In another embodiment of the invention, the liquid is water, preferably clear water or white water.

Another aspect of the invention relates to the use of an apparatus according to the invention and a method according to the invention for cleaning contaminated solid-liquid mixtures, preferably contaminated fiber suspensions, particularly preferably contaminated paper fiber suspensions.

In summary, it can be stated that the inflowing quantity of the liquid before the Venturi mixing element is equal to the quantity flowing out of the Venturi mixing element, wherein the pressure downstream of the Venturi mixing element is lower. The flow velocity is higher downstream of the Venturi mixing element because the liquid is enriched with gas bubbles.

The quantity of liquid and its flow velocity may vary depending on the application. They need to be adapted to the respective application in order to achieve an optimum cleaning effect.

Importantly, to achieve a good cleaning effect, the flow velocity of the quid enriched with gas bubbles must be higher than the flow velocity of the solid-liquid mixture.

Preferred embodiments of the invention result from the combination of the claims or of individual features thereof.

The invention will now be described in more detail with reference to several exemplary embodiments. The accompanying drawings show in:

DETAILED DESCRIPTION OF THE INVENTION

Figure 1:
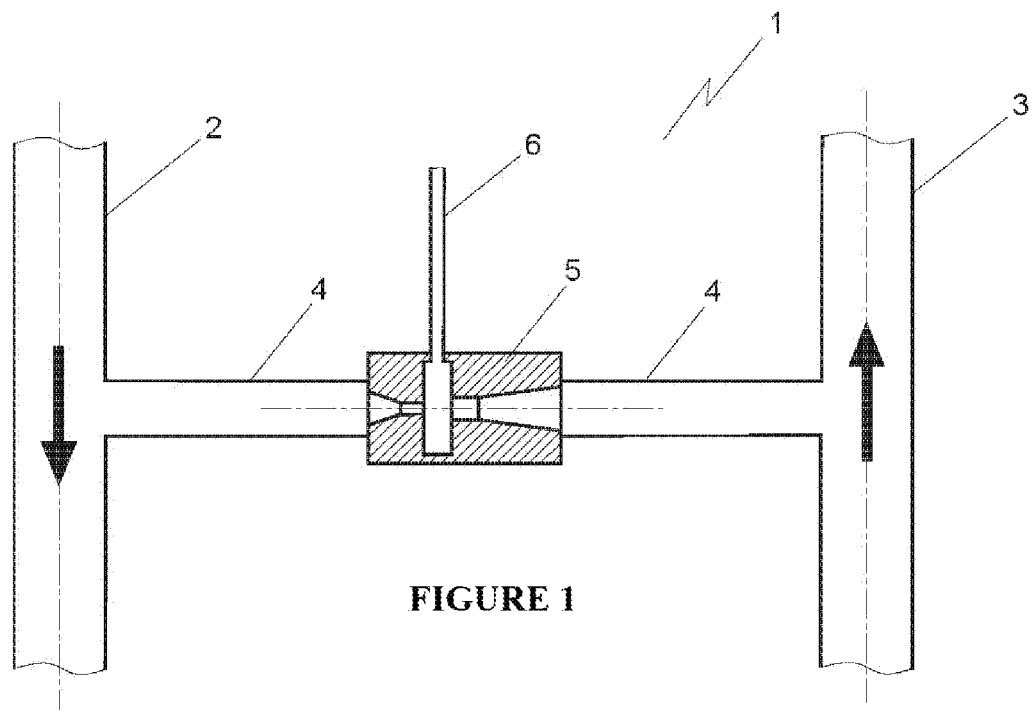
FIG. 1: a schematic diagram of an apparatus for cleaning contaminated solid-liquid mixtures, in FIG. 2: a schematic sectional view of a Venturi mixing element, in FIG. 3a: a schematic diagram of the arrangement of the small through-openings of the cones in a side wall of the cavity between the cones for a Venturi mixing element with 4 cones pairs, in FIG. 3b: a schematic diagram of the arrangement of the small through-openings of the cones in a side wall of the cavity between the cones for a Venturi mixing element with 7 cones pairs, in FIG. 3c: a schematic diagram of the arrangement of the small through-openings of the cones in a side wall of the cavity between the cones for a Venturi mixing element with 19 cones pairs, in FIG. 4a: a schematic diagram of an embodiment of the apparatus for cleaning contaminated sold-liquid mixtures, in FIG. 4b: a schematic diagram of another embodiment of the apparatus fog cleaning contaminated solids-liquid mixtures, in FIG. 4c: a schematic diagram of another embodiment of the apparatus for cleaning contaminated solids-liquid mixtures, in FIG. 5a: a schematic cross-sectional view perpendicular to the flow direction of the junction of the third conduit into the second conduit, in FIG. 5b: a schematic cross-sectional view of the junction of the third conduit into the second conduit, and in FIG. 5c another schematic cross-sectional view of an alternative embodiment of the opening of the third conduit into the second conduit.

In a first exemplary embodiment, FIG. 1 shows schematically an apparatus 1 according to the invention, with a first conduit 2 for supplying a liquid which is clear water or white water, hereinafter simply referred to as water. The water in the first conduit 2 has a flow velocity of 1 m/s to 5 m/s and a pressure of 2 to 4 bar. The apparatus 1 includes a second conduit 3 for conveying a solid-liquid mixture with a flow velocity of <4 m/s, in this example a paper fiber suspension. An unillustrated fractionator is arranged downstream of the second conduit 3. The paper fiber suspension contains contaminants in the form of impurities and contaminants (ink particles, stickies, very small plastic particles, etc.).

A third conduit 4 having a Venturi mixing element is arranged between the first and the second conduit 2, 3. A fourth conduit 6 for conveying a gas, in the described example air, extends to this Venturi mixing element 5. In the mixing element 5, which operates according to the Venturi principle, the water is enriched with gas bubbles of different size and at the same time significantly accelerated. Downstream of the Venturi mixing element, the water enriched with gas bubbles has a flow velocity of about 9 m/s to 25 m/s. This water enriched with gas bubbles is conveyed to the solid-liquid mixture, whereby the impurities and contaminants become detached from the paper fibers, as a result of the kinetic energy of the gas bubbles, during collision of the gas bubbles with the paper fibers to which these impurities and contaminants adhere. This is a decisive advantage of the method according to the invention.

The water enriched with gas bubbles contains a large number of gas bubbles of different size. This different size of the gas bubbles is important in order to achieve attachment to a wide size range of contaminants and impurities to be separated. An effective separation of different impurities and contaminants requires adjustment of the number and size distribution of the gas bubbles. The number and size distribution of the gas bubbles in the water depends not only on the flow velocity of the liquid and the drawn-in quantity of gas, but to a large extent on the constructive design of the Venturi mixing element 5.

Figure 2:
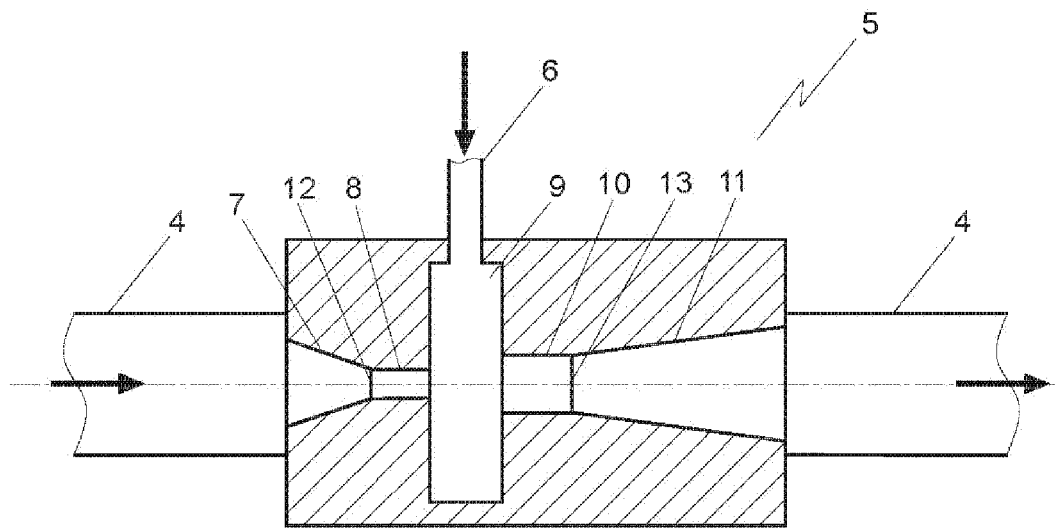

FIG. 2 shows schematically a sectional view of the Venturi mixing element 5. The Venturi mixing element 5 has a first cone 7, which causes narrowing of the cross section. The third conduit 4 is connected to the large through-opening of the first cone 7, in particular with the part that is connected to the first conduit 2. Furthermore, the Venturi mixing element 5 has a first non-conical conduit section 8 which adjoins the small through-opening 12 of the first cone 7 and has substantially the same cross-sectional area, namely that of the small through-opening 12 of the first cone 7. The first non-conical conduit section 8 opens into a chamber 9 forming a cavity. The fourth conduit 6 is connected to this chamber 9. A second non-conical conduit section 10 is arranged in alignment with, but opposite to the opening of the first non-conical conduit section 8 into the chamber 9, the small through-opening 13 of a second cone 11 adjoining the non-conical conduit section 10. The third conduit 4 is connected to the large through-opening of the second cone 11, in particular with the part that is connected to the second conduit. The chamber 9 forms a substantial enlargement of the cross-sectional area.

Water is supplied to the Venturi mixing element 5 by way of the section of the third conduit 4 that is connected to the first conduit 2. The flow velocity of the water is accelerated by the first cone 7 and enters the cavity of the chamber 9 as a liquid jet with increased flow velocity. This generates negative pressure which causes the water flowing with increased velocity into the cavity of the chamber 9 to absorb and entrain gas which is then drawn into the cavity through the fourth conduit. Downstream of the chamber 9, i.e. after the abrupt increase in the cross-sectional area for the water which flows through this chamber 9 quasi as a kind of water jet, the water jet with the absorbed or entrained gas enters the second non-conical conduit section 10 of the small through-opening 13 of the second cone 11. This conduit section 10 continues in the second cone 11, accompanied by a further increase in the cross-sectional area for the water. In this conduit section 10 and in the adjacent second cone 11 of the Venturi mixing element 5, very intense intermixing of water with the absorbed or entrained gas takes place, whereby the gas is distributed in the water as bubbles of different sizes. Upon exiting the Venturi mixing element 5 into the third conduit 4, the water is highly enriched with gas in the form of different-sized bubbles. These different-sized gas bubbles are important for achieving an accumulation on impurities and contaminants having a wide range of different sizes.

In one design of the exemplary embodiment, the third conduit 4 is designed as DN 80 conduit. The first conical section 7 includes a reduction of the cross-sectional area from a cross-sectional diameter of the large through-opening of 16 mm to a cross-sectional diameter of the small through-opening of 12 mm. The first non-conical conduit section 8 has therefore a cross-sectional diameter of 12 mm and a length of approximately 50 mm. Longer designs of the non-conical conduit section 8 are possible. The chamber 9 has a width of 10 mm, meaning that the opening of the first non-conical conduit section 8 in the chamber 9 is spaced 10 mm apart from the opposite opening of the second non-conical conduit section 10 adjoined by the second cone 11. The second non-conical section 10 as well as the small through-opening 13 of second cone 11 each have a cross section with a diameter of 16 mm. The large through-opening of the second cone 11 has a cross section with a diameter of 18 mm. The second non-conical region 10 downstream of the chamber 9 and the second conical portion 11 with an increase in the diameter from 16 mm to 18 mm are important for the formation of differently sized gas bubbles in the water. Here, the differently sized gas bubbles required for subsequent flotation are formed. The Venturi mixing element has a total length of 300 mm.

Described above is a Venturi mixing element 5 with a cone pair, i.e. with two oppositely directed cones 7, 11. It is possible and advantageous to arrange more than one cone pair in a Venturi mixing element 5.

Figure 3A:
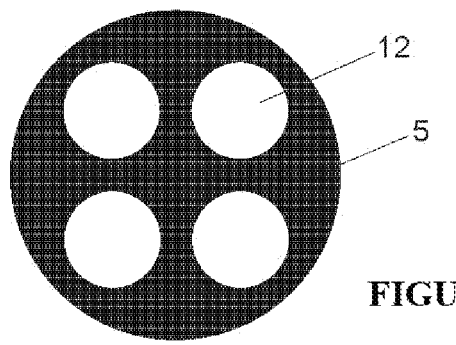
Figure 3B:
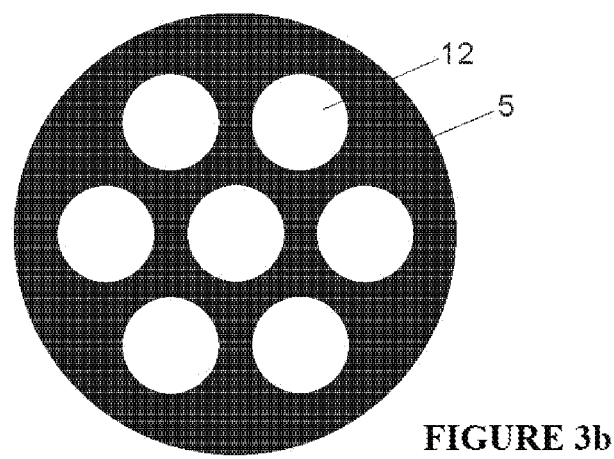
Figure 3C:
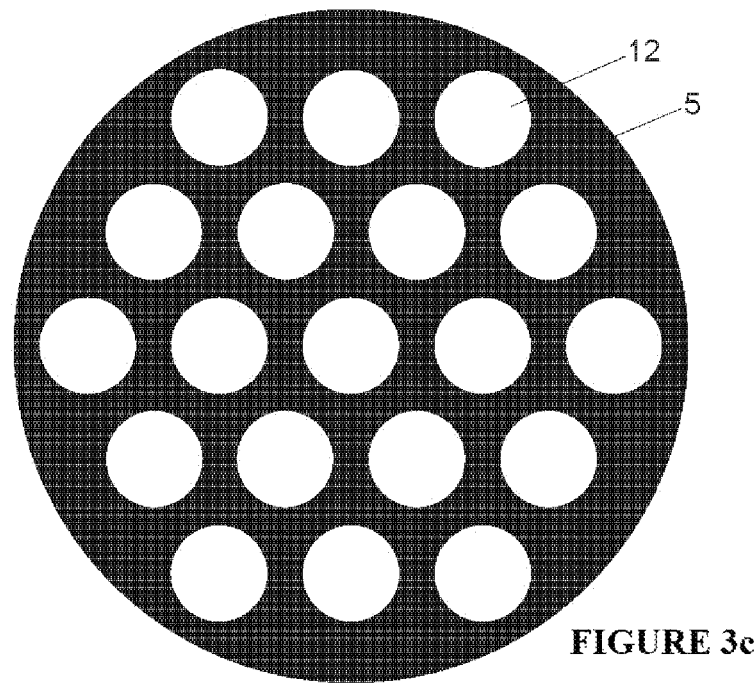

FIGS. 3*a* to *c* show the arrangement of the openings of the non-conical conduit sections in a side wall of the chamber 9 between the cones 7, 11 for a Venturi mixing element 5 with 4, 7 or 19 cone pairs.

Figure 4A:
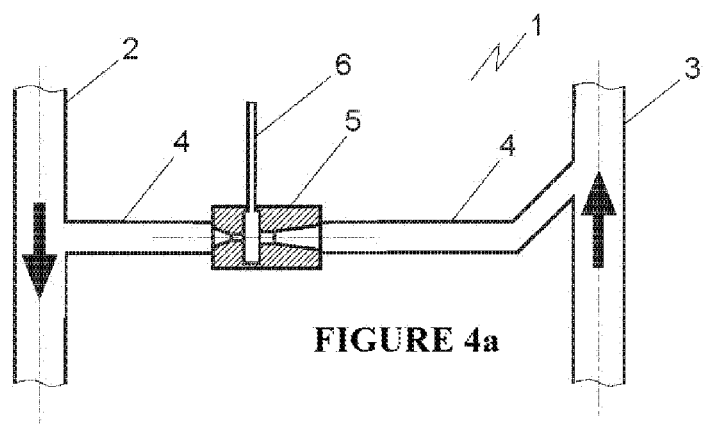

In a further embodiment, in FIG. 4*a* shows an embodiment of the apparatus according to FIG. 1, wherein the third conduit 4 opens into the second conduit 3 at an angle of 45°. The confluence occurs in the flow direction of the solid-liquid mixture, which is represented by the arrow. Preferably, the second conduit 3 has a larger diameter than the third conduit 4.

Figure 4B:
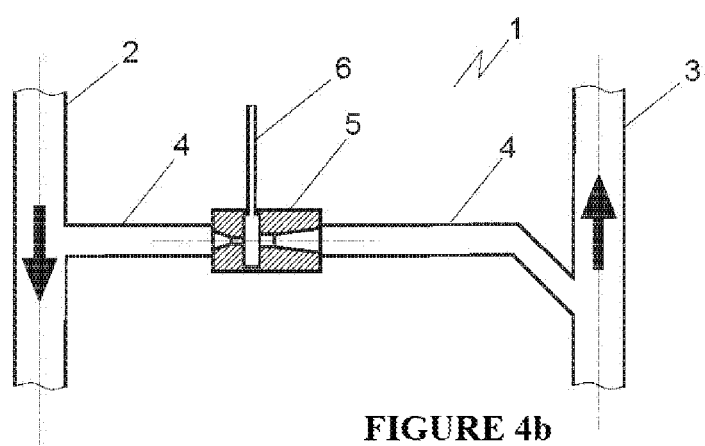

In another embodiment of the aforedescribed exemplary embodiment illustrated in FIG. 4*b*, the third conduit 4 opens into the second conduit 3 in opposition to the flow direction of the solid-liquid mixture. In this case, however, the angle should not fall below 45°, since otherwise intermixing of the solid-liquid mixture with the gas bubbles introduced with the water becomes less effective, thereby diminishing the efficiency of the flotation process.

Figure 4C:
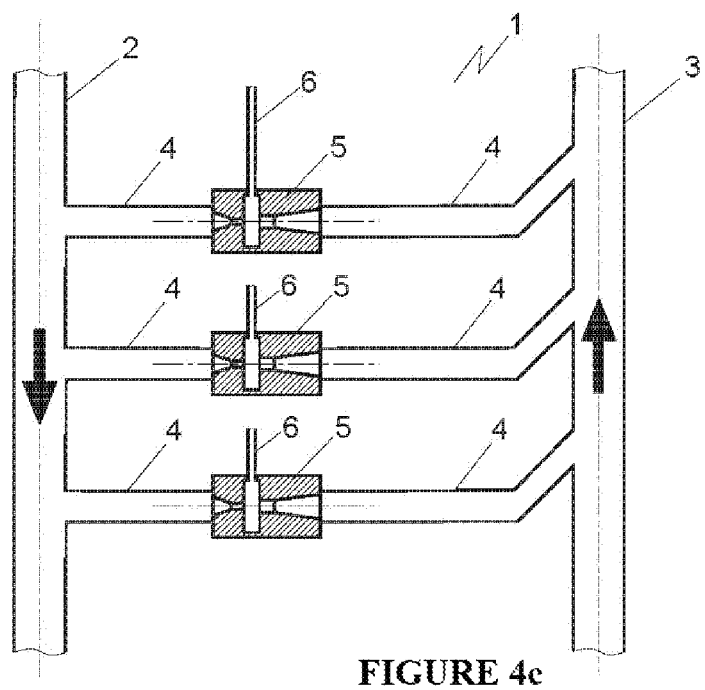

Another embodiment of the aforedescribed exemplary embodiment is shown n FIG. 4*c*, Here, the apparatus includes a plurality of Venturi mixing elements 5, which open consecutively into the second conduit 3 in the flow direction of the solid-liquid mixture. Better intermixing of the solid-liquid mixture with the gas bubbles introduced into the water in the second conduit 3 results when several parallel-acting Venturi mixing elements 5 are used. In addition, the cleaning effect is improved when the water enriched with the gas bubbles is introduced into the solid-liquid mixture at several feed locations.

Figure 5A:
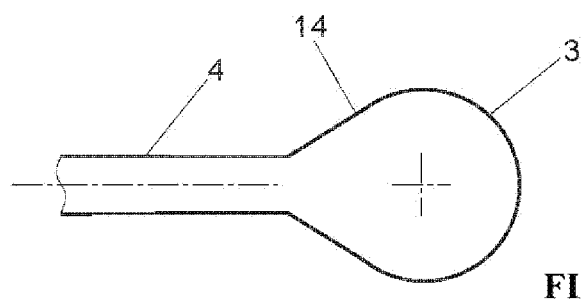

FIG. 5*a* shows schematically a fan-shaped opening 14 of the third conduit 4 into the second conduit 3. With a fan-shaped design of the opening 14, better intermixing of the solid-liquid mixture in the second conduit 3 with the water enriched with gas bubbles from the third conduit 4 is achieved. The cross-sectional area the fan-shaped opening 14 has the same size as the cross-sectional area of the second conduit 3, so that the flow velocity of the water enriched with gas bubbles is not changed and the cleaning effect is not adversely affected.

Figure 5B:
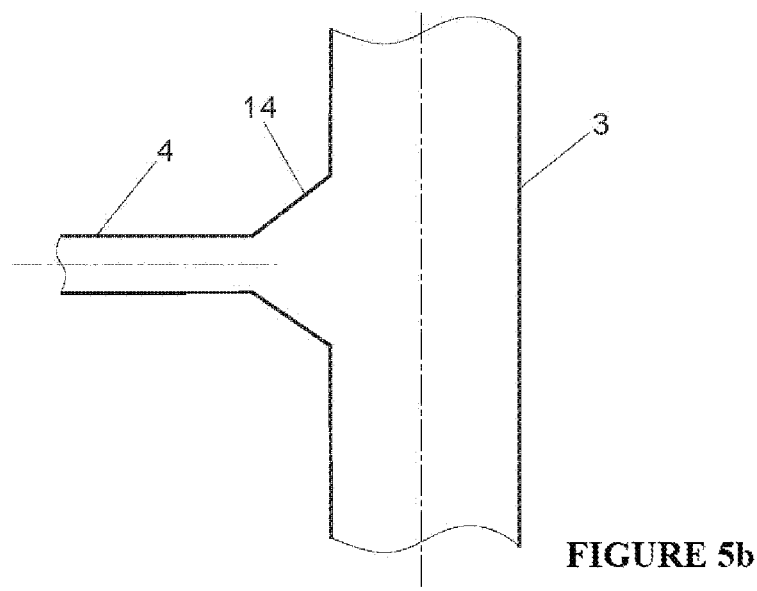

FIG. 5b also shows schematically an alternative embodiment of a fan-shaped opening 14 of the third conduit 4 into the second conduit 3, wherein the fan-shaped expansion of the opening 14 is aligned parallel to the flow direction of the solid-liquid mixture in the second conduit 3.

Figure 5C:
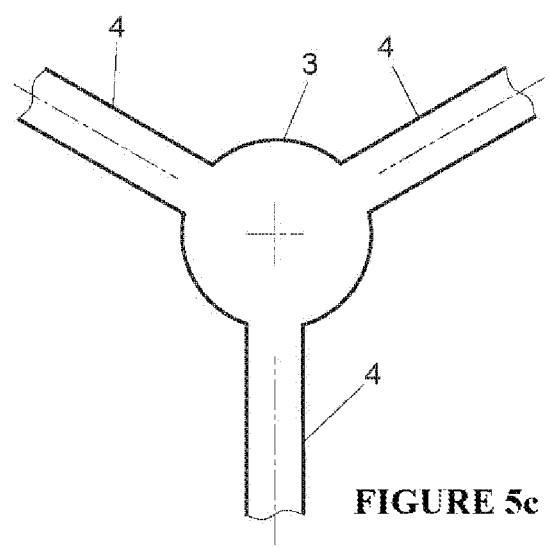

FIG. 5c shows the junctions of three third conduits 4 into the second conduit 3, wherein the third conduits 4 are arranged around the second conduit 3 in the shape of a star. This arrangement of the junctions of several parallel flows of water enriched with gas bubbles in the second conduit 3 carrying the solid-liquid mixture provides better intermixing of the solid-liquid mixture with the gas bubbles introduced in the second conduit 3 with the water.

Although not illustrated in the figures, the apparatus 1 includes devices for controlling or regulating the water and/or gas flows. These are, for example, sliders arranged upstream or downstream of the Venturi mixing element 5 in the third conduit 4 and in the fourth conduit 6 for affecting the respective water and/or gas flow. The sliders may be configured for electrical or manual operation. With the sliders, the numb the size and the size distribution of the gas bubbles in the liquid can be influenced.

LIST OF REFERENCE NUMERALS USED 1 apparatus
2 first conduit
3 second conduit
4 third conduit
5 Venturi mixing element
6 fourth conduit
7 first cone
8 first non-conical conduit section
9 chamber, cavity
10 second non-conical conduit section
11 second cone
12 small through-opening of the first cone 7
13 small through-opening of the second cone 10
14 fan-shaped junction of the third conduit into the second conduit

The invention claimed is:

1. An apparatus (1) for cleaning contaminated solid-liquid mixtures,
comprising:
at least one first conduit (2) for supplying a liquid,
at least one second conduit (3) for conveying a solid-liquid mixture,
at least one third conduit (4) that connects the first and the second conduit (2, 3) and comprises at least one mixing element (5), which operates according to the Venturi principle,
wherein the mixing element (5) has two oppositely directed cones (7, 11) including a first cone (7) and a second cone (11), with each of the cones opening with its respective small through-opening into a chamber (9) forming a cavity, wherein a region of the opening into the chamber (9) forming the cavity is designed so that each small through-opening (12, 13) of the cones (7, 11) is continued in a non-conical conduit section (8, 10) commensurate with a cross-sectional area of the small through-openings (12, 13), with these non-conical conduit sections (8, 10) opening into the chamber (9) disposed between the cones (7, 11), a large through-opening of the first cone (7) is connected via the third conduit (4) with the first conduit (2) and the large through-opening of the second cone (11) is connected via the third conduit (4) with the second conduit (2), the small through-opening (12) of the first cone (7) is formed to be smaller than the small through-opening (13) of the second cone (11), and the two oppositely directed cones (7, 11) and the non-conical conduit sections are arranged in longitudinal axial alignment,
at least one fourth conduit (6) for conveying a gas, wherein the fourth conduit (6) opens into the chamber (9) of the mixing element (5) forming the cavity, and
at least one fractionator arranged downstream of the second conduit (3) for removing foam produced by flotation;
wherein the chamber (9) forming the cavity enlarges a cross-sectional area in a lateral direction both above and below the non-conical conduit sections; and the enlarged cross-sectional area in the lateral direction of the chamber (9) forming the cavity exceeds each of a diameter of the large through-opening of the first cone (7) and a diameter of the large through-opening of the second cone (11).

2. The apparatus according to claim 1, wherein the small through-opening (12) of the first cone (7) is constructed to be between 20 and 40% smaller than the small through-opening (13) of the second cone (11).

3. The apparatus according to claim 1, wherein the third conduit (4) opens into the second conduit (3) at an angle of 90°±45°.

4. The apparatus according to claim 3, wherein the third conduit (4) opens into the second conduit (3) at an angle of 45° in the flow direction or opposite to the flow direction of the second conduit.

5. The apparatus according to claim 1, wherein the apparatus (1) comprises a plurality of third conduits (4) each with an associated mixing element (5), the plural third conduits (4) having a cascaded arrangement and are disposed between the first conduit and the second conduit (3).

6. A method for cleaning contaminated solid-liquid mixtures, comprising the steps of:
supplying a liquid to a Venturi mixing element (5),
conveying a gas to the Venturi mixing element (5),
enriching in the Venturi mixing element (5) the liquid with gas bubbles of different size and size distribution,
conveying the liquid enriched with gas bubbles of different size and size distribution to a contaminated solid-liquid mixture, wherein the liquid enriched with gas bubbles has a higher flow velocity than the solid-liquid mixture,
intermixing the liquid enriched with gas bubbles and solid-liquid mixture whereby impurities and contaminants are detached from the solids of the solid-liquid mixture by the kinetic energy of the gas bubbles and accumulate at the gas bubbles, wherein the gas bubbles subsequently remove the impurities and contaminants from the solid-liquid mixture as foam, and
separating the solid-liquid mixture and the foam in a subsequent flotation process;
wherein the Venturi mixing element (5) has two oppositely directed cones (7, 11), with each of the cones opening with its respective small through-opening (12, 13) into a chamber (9) forming a cavity, wherein a region of the opening into the chamber (9) forming the cavity is designed so that each small through-opening (12, 13) of the cones (7, 11) is continued in a non-conical conduit section (8, 10) commensurate with a cross-sectional area of the small through-openings (12, 13), with these non-conical conduit sections (8, 10) opening into the chamber (9) disposed between the cones (7, 11), a large through-opening of the first cone (7) is connected via a third conduit (4) with a first conduit (2) and the large through-opening of second cone (11) is connected via the third conduit (4) with the second conduit (2), the small through-opening (12) of first cone (7) is formed to be smaller than the small through-opening (13) of the second cone (11), and the two oppositely directed cones (7, 11) and the non-conical conduit sections are arranged in longitudinal axial alignment, at least one fourth conduit (6) for conveying a gas, wherein the fourth conduit (6) opens into the chamber (9) of the Venturi mixing element (5) forming the cavity, and at least one fractionator arranged downstream of the second conduit (3) for removing a foam produced by flotation;

wherein the chamber (9) forming the cavity enlarges a cross-sectional area in a lateral direction both above and below the non-conical conduit sections; and the enlarged cross-sectional area in the lateral direction of the chamber (9) forming the cavity exceeds that of a diameter of the large through-opening of the first cone (7); and the enlarged cross-sectional area in the lateral direction of the chamber (9) forming the cavity exceeds each of a diameter of the large through-opening of the first cone (7) and a diameter of the large through-opening of the second cone (11).

7. The method of claim 6, wherein the liquid is enriched with gas bubbles of different size and size distribution such that the liquid is enriched with gas bubbles having a ratio of gas to liquid of 1-4:1.

8. The method according to claim 6, wherein the liquid in the first conduit (2) flows with a flow velocity of 1 m/s to 5 m/s.

9. The method of claim 6, wherein the solid-liquid mixture in the second conduit (3) flows at a flow velocity of <4 m/s.

10. The method of claim 6, wherein the liquid enriched with gas bubbles flows downstream of the Venturi mixing element (5) with a flow rate of 5-40 m/s.

11. The method of claim 6, wherein the contaminated solid-liquid mixture is a contaminated fiber suspension.

12. The method of claim 11, wherein the contaminated fiber suspension is a paper fiber suspension.

13. The method of claim 6, wherein the supplied liquid is water.

14. The method of claim 6, wherein the conveying gas is air.

15. The method of claim 10, wherein the flow rate is 5-25 m/s.

16. The method of claim 10, wherein the flow rate is 9-25 m/s.

17. The method of claim 6, wherein the liquid is enriched with gas bubbles which has a ratio of gas to liquid of 1:1.

* * * * *